(12) United States Patent
Stark et al.

(10) Patent No.: US 8,938,972 B2
(45) Date of Patent: Jan. 27, 2015

(54) ENGINE APPARATUS AND METHOD FOR REDUCING A SIDE LOAD ON A FLYING OBJECT

(71) Applicant: Deutsches Zentrum fuer Luft- und Raumfahrt e.V., Cologne (DE)

(72) Inventors: Ralf Stark, Widdern (DE); Chloé Génin, Neudenau (DE)

(73) Assignee: Deutsches Zentrum fuer Luft-und Raumfahrt e.V., Cologne (DE)

( * ) Notice: Subject to any disclaimer, the term of this patent is extended or adjusted under 35 U.S.C. 154(b) by 0 days.

(21) Appl. No.: 13/869,223

(22) Filed: Apr. 24, 2013

(65) Prior Publication Data

US 2013/0233942 A1 Sep. 12, 2013

Related U.S. Application Data

(63) Continuation of application No. PCT/EP2011/068508, filed on Oct. 24, 2011.

(30) Foreign Application Priority Data

Oct. 25, 2010 (DE) .......................... 10 2010 042 890

(51) Int. Cl.
| | |
|---|---|
| *F02K 1/00* | (2006.01) |
| *F02G 1/00* | (2006.01) |
| *B64D 33/04* | (2006.01) |
| *B63H 11/00* | (2006.01) |
| *F02K 9/97* | (2006.01) |
| B64G 1/40 | (2006.01) |
| *B64G 1/00* | (2006.01) |
| *B64G 5/00* | (2006.01) |

(52) U.S. Cl.
CPC . *F02K 9/97* (2013.01); *B64G 1/401* (2013.01); *B64G 1/002* (2013.01); *B64G 5/00* (2013.01)
USPC .......... 60/770; 60/771; 60/200.1; 239/265.11

(58) Field of Classification Search
USPC ..................... 60/770, 771, 200.1; 239/265.11
See application file for complete search history.

(56) References Cited

U.S. PATENT DOCUMENTS

| | | | |
|---|---|---|---|
| 2,967,393 A | 1/1961 | Von Braun | |
| 2,998,754 A * | 9/1961 | Bialy ........................... | 89/1.816 |

(Continued)

FOREIGN PATENT DOCUMENTS

| | | |
|---|---|---|
| JP | 07139431 A | 5/1995 |
| WO | WO 00/34641 | 6/2000 |

OTHER PUBLICATIONS

Hagemann et al., "Advanced Rocket Nozzles," *Journal pf Propulsion and Power*, 1998, pp. 620-634, vol. 14, No. 5.

*Primary Examiner* — Phutthiwat Wongwian
*Assistant Examiner* — William Breazeal
(74) *Attorney, Agent, or Firm* — Womble Carlyle Sandridge & Rice, LLP

(57) ABSTRACT

An engine apparatus is provided for a flying object, the engine apparatus including a combustion chamber having a throat region and a nozzle region, the nozzle region having a nozzle wall, wherein the nozzle region expands from the throat region towards an exit end relative to a combustion chamber axis, wherein the nozzle region has associated therewith a skirt having a skirt wall, the skirt being positioned downstream relative to the exit end and surrounding the exit end of the nozzle region, and wherein the skirt wall is at an acute angle away from the combustion chamber axis with respect to the nozzle wall, at least at the exit end of the nozzle region.

18 Claims, 5 Drawing Sheets

(56) References Cited

U.S. PATENT DOCUMENTS

| | | |
|---|---|---|
| 3,249,306 A | 5/1966 | Altseimer |
| 3,394,549 A | 7/1968 | Sutor |
| 4,480,437 A | 11/1984 | Gauge |
| 5,481,870 A * | 1/1996 | Pacou et al. .................... 60/266 |
| 6,572,030 B2 | 6/2003 | Vuillamy et al. |
| 6,574,964 B1 * | 6/2003 | Haggander et al. ............ 60/770 |
| 2001/0017539 A1 | 8/2001 | Brunsch et al. |
| 2004/0231316 A1 | 11/2004 | Hagemann et al. |

* cited by examiner

ENGINE APPARATUS AND METHOD FOR REDUCING A SIDE LOAD ON A FLYING OBJECT

CROSS-REFERENCE TO RELATED APPLICATIONS

The present application is a continuation of international application number PCT/EP2011/068508, filed on Oct. 24, 2011, which claims priority to German patent application number 10 2010 042 890.6, filed on Oct. 25, 2010, the entire specification of both being incorporated herein by reference in their entirety and for all purposes.

BACKGROUND OF THE INVENTION

The invention relates to an engine apparatus for a flying object, comprising a combustion chamber having a throat region and a nozzle region, said nozzle region having a nozzle wall, wherein the nozzle region expands from the throat region towards an exit end of the nozzle region relative to a combustion chamber axis.

The invention further relates to a flying object.

Furthermore, the invention relates to a test stand or a launching ramp for a flying object.

Furthermore, the invention relates to a method for reducing a side load in an engine apparatus, particularly in a startup phase and/or in a shutdown phase.

U.S. Pat. No. 4,480,437 discloses an unfoldable device for extending the nozzle of a rocket motor, consisting of a frustoconical skirt formed by a stack of tube rings or coils that are welded together. The tube rings or coils have a cross-section that is flattened in the direction of the stack. Furthermore, a pyrotechnic device is provided which is received in the tube and is capable of generating sufficient pressure in order to increase the dimensions of the tube in the direction of the stack after ignition.

U.S. Pat. No. 3,249,306 discloses an automatically adjustable nozzle for a rocket, comprising a fixed-diameter part that surrounds an outlet of a combustion chamber of a rocket motor. Furthermore, an elongated tubular skirt is provided that is secured at its forward end to said fixed-diameter part and extends rearwardly therefrom. The wall of said skirt has a plurality of longitudinally extending corrugations.

U.S. Pat. No. 2,967,393 discloses a rocket.

JP 07139431 A discloses a nozzle in which an inner cylinder is fixed to an inner circumferential surface of the nozzle by means of a separation bolt.

During the startup operation and also during the shutdown operation of an engine apparatus in a flying object and particularly a rocket, separation of flow takes place in the supersonic part of the nozzle region. Said flow separation is asymmetrically distributed around the circumference of the nozzle region and fluctuates. The asymmetric distribution leads to high side loads. The side loads occurring during the startup operation and the shutdown operation of an engine apparatus may reach magnitudes that are far beyond the side loads of an engine apparatus operating at nominal combustion chamber pressure.

SUMMARY OF THE INVENTION

In accordance with an embodiment of the invention, there is provided an engine apparatus in which side loads are reduced.

In accordance with an embodiment of the invention, the engine apparatus comprises a nozzle region having associated therewith a skirt having a skirt wall, said skirt being positioned downstream relative to the exit end of the nozzle region and surrounding the exit end of the nozzle region, and the skirt wall is at an acute angle away from the combustion chamber axis with respect to the nozzle wall, at least at the exit end of the nozzle region.

In the solution in accordance with the invention, an intake cross-section is increased. This allows the mass flow of intake ambient air and the velocity of intake ambient air to be increased as compared to an engine apparatus with no skirt. Damping asymmetrically distributed, fluctuating flow separations and reducing pressure in a separated region can be accomplished. This in turn leads to a considerable reduction of side loads.

Furthermore, stabilizing flow during nominal operation of the engine apparatus can be accomplished.

In principle, a skirt itself has no effect on full load operation of the engine apparatus.

The skirt can be fixedly connected to the nozzle region, or the skirt can be connected to a test stand or a launching ramp and then acts on the nozzle region only during the startup phase.

By providing a skirt, it is possible to reduce side loads. This also reduces transverse forces. As a result, control or adjustment elements that transfer transverse forces to the structure of the flying object can be implemented using simpler design. The same applies to the structure of the flying object. This allows the costs of the engine apparatus and of the structure of the flying object to be reduced, payload capacity to be increased and payloads to be used that are sensitive to transverse forces.

Adapting the engine apparatus to the startup phase can be achieved using simpler design.

In particular, the skirt expands outward relative to the combustion chamber axis. A larger intake cross-section can thereby be achieved as compared to the exit end of the nozzle region.

For the same reason, it is advantageous for the skirt to have, at an exit end thereof facing away from the exit end of the nozzle region, a cross-sectional area greater than that of the nozzle region at the exit end thereof facing towards the skirt.

It is further advantageous for the skirt to be configured to be rotationally symmetric about the combustion chamber axis in order to provide an effective way of damping or reducing asymmetric fluctuations.

In particular, the nozzle region is the nozzle region of a supersonic nozzle. It is then possible to reduce flow separation-induced fluctuations.

In particular, an inflection exists between the nozzle wall and the skirt wall at the transition from the exit end of the nozzle region to the skirt. (A transition contour then exists which cannot be distinguished at the transition. In principle, it is advantageous for the transition itself to be continuous, i.e. without a gap. It is also possible to provide for a small gap, in particular in those instances in which the skirt is arranged to be ground-fixed.) By providing such an inflection, it is possible to stabilize the flow during nominal operation of the engine apparatus. Furthermore, the intake cross-section can be increased.

It has proven advantageous for the acute angle to be in a range between 3° and 15°, in particular 5°, 7°, 10° or 15°, for example.

Further, it has proven advantageous for a length of the skirt along the combustion chamber axis to be at most 25% of the length of the nozzle region along the combustion chamber axis.

In particular, it is advantageous for a length of the skirt along the combustion chamber axis to be in a range between 0.3 and 2.5, in particular a range between 0.5 and 2, of a radius in the throat region. This results in a dimensional design that is optimized for damping fluctuations or reducing fluctuations.

In an embodiment, the skirt is fixed to a holding area from where a flying object provided with the engine apparatus is launched. The holding area is in particular part of a launching ramp. It is then possible to achieve a reduction in side loads for the startup phase, wherein the skirt remains on the ground and, therefore, the flying object need not carry the skirt along with it.

It has proven advantageous for a distance between the exit end of the nozzle region and the skirt to be in a range between 0 and 0.6, and in particular between 0 and 0.5, and in particular about 0.4, of a radius in the throat region. In an embodiment, said distance between the exit end of the nozzle region and a corresponding end of the skirt facing towards the exit end of the nozzle region is about 5 cm for example.

Alternatively, it is possible for the skirt to be fixed relative to the nozzle region and, in particular, to be co-flying. This allows for side load reductions to be achieved over a wider range of altitudes.

It is advantageous for the skirt wall to have a contour which lies along an isobar. If, accordingly, the contour of the skirt lies along a shear layer, then it is possible to ensure that during the ascent of a flying object (particularly a rocket), the flow separation of the full flowing nozzle, which has already been stabilized on the ground, jumps rapidly to the exit end of the skirt. Furthermore, this provides a way of achieving a gain in impulse.

In accordance with the invention, provision is made for a flying object which is provided with an engine apparatus constructed in accordance with the invention.

In particular, provision is made for the engine apparatus to be ignited on the ground. Due to system constraints, this then presents the problem of flow separation occurring in the supersonic part of the nozzle region.

In particular, the engine apparatus is then provided on a lower stage or a main stage of the flying object.

Further in accordance with the invention, provision is made for a test stand or a launching ramp for a flying object which is provided with an engine apparatus constructed in accordance with the invention, wherein the test stand or the launching ramp comprises a non-co-flying holding area at which the skirt is arranged. Side loads can thereby be reduced directly during the starting sequence, wherein the skirt is non-co-flying, whereby the skirt does not reduce the payload.

In particular, a distance between the exit end of the nozzle region and the skirt is in a range between 0 and 0.6, and in particular between 0 and 0.5, of a radius in the throat region. In a preferred exemplary embodiment, said distance is about 0.4 of the radius mentioned.

In a method in accordance with the invention for reducing a side load in an engine apparatus, particularly in the startup phase and/or the shutdown phase, a skirt is arranged in a nozzle region (and in particular a supersonic nozzle region) of the engine apparatus, said skirt having an exit cross-section greater than that of the nozzle region, wherein by use of the skirt a larger volume of air is drawn into a separation region of the nozzle region, as compared to the case without a skirt.

By use of the skirt, the intake cross-section is increased so that a larger volume of air can be taken in. Furthermore, said volume of air has a higher velocity. It is thereby possible to damp or reduce asymmetric fluctuations both in a separation zone and in a separated region, and the side load is reduced.

The method in accordance with the invention has the advantages that have already been described in connection with the apparatus constructed in accordance with the invention.

The following description of preferred embodiments of the invention serves to explain the invention in greater detail in conjunction with the drawings.

DETAILED DESCRIPTION OF THE INVENTION

Figure 1:
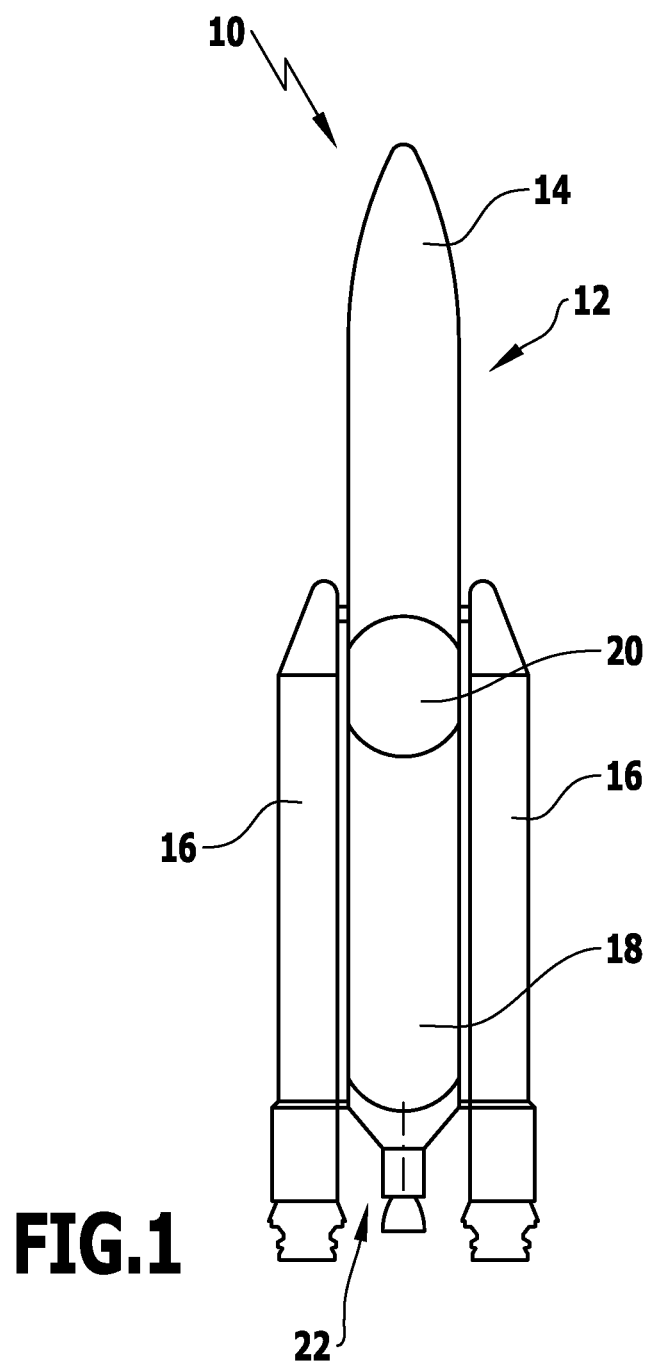
FIG. 1 is a schematic representation of a flying object comprising an engine apparatus.
Figure 2:
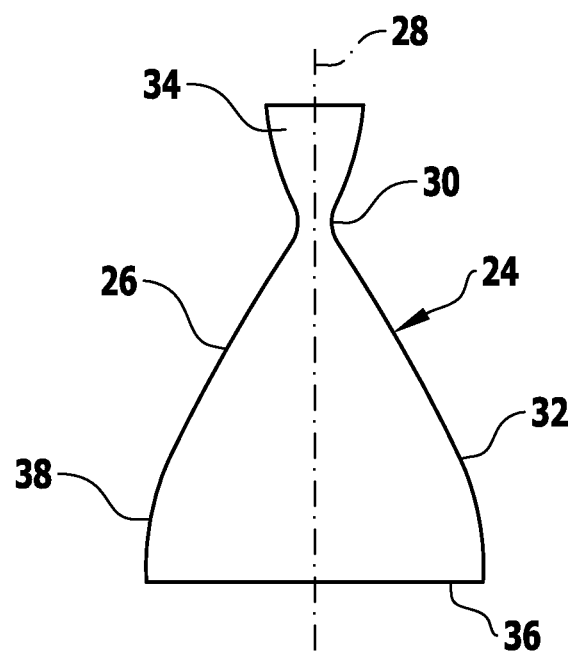
FIG. 2 is a schematic representation of an exemplary embodiment of an engine apparatus known from the state of the art.

An exemplary embodiment of a flying object 10, shown schematically in FIG. 1, is a rocket. Said rocket comprises a main body 12 by which a payload unit 14 can be transported. The rocket has two solid boosters 16 for example.

The main body 12 comprises a first tank 18 and a second tank 20. The first tank 18 contains a fuel, such as liquid hydrogen. The second tank 20 holds an oxidizer.

Arranged on the main body 12 of the flying object 10 is an engine apparatus, designated in its entirety by the reference numeral 22. Said engine apparatus 22 is supplied with fuel from the first tank 18 and oxidizer from the second tank 20.

In principle, the engine apparatus 22 comprises a combustion chamber 24 having a combustion chamber wall designated in its entirety by reference numeral 26. In particular, the combustion chamber 24 is configured to be rotationally symmetric about a combustion chamber axis 28.

The combustion chamber 24 is configured as a supersonic nozzle having a throat region 30 and a nozzle region 32. Furthermore, the combustion chamber 24 has a combustion space region 34. The throat region 30 follows the combustion space region 34 and is located between the combustion space region 34 and the nozzle region 32. The combustion chamber 24 has its narrowest cross-section within the throat region 30, i.e. the combustion space region 34 narrows down towards the throat region 30. The nozzle region 32 expands from the throat region 30 towards an exit end 36 of the nozzle region 32.

The nozzle region 32 comprises a nozzle wall 38 as part of the combustion chamber wall 26.

Figure 3:
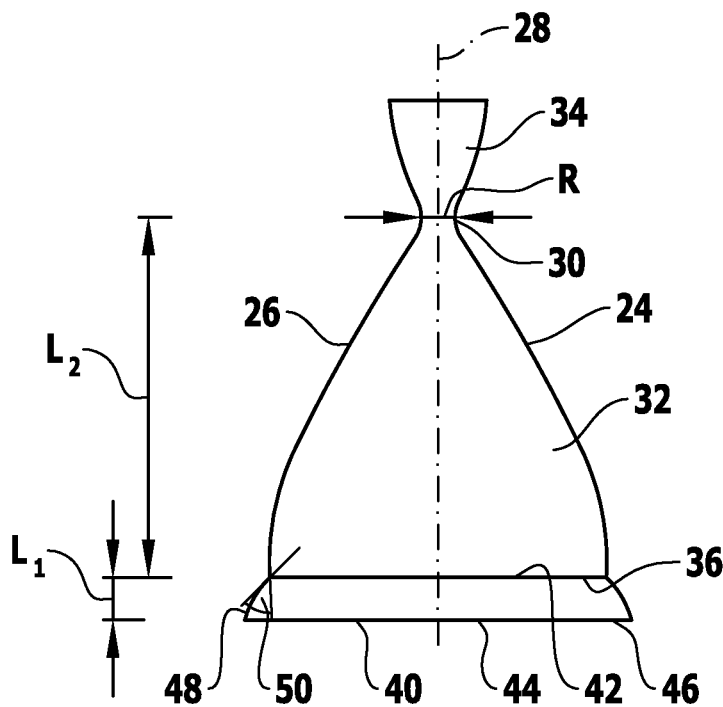
FIG. 3 is a schematic representation of a first exemplary embodiment of an engine apparatus constructed in accordance with the invention.

In an exemplary embodiment of an engine apparatus constructed in accordance with the invention, shown schematically in FIG. 3, the nozzle region 32 has, at a location downstream thereof, a skirt 40. Said skirt 40 surrounds the nozzle region 32 at the exit end 36 thereof. The skirt 40 has a first side 42 facing towards the exit end 36 of the nozzle region 32 and a second side 44 opposite thereto. In particular, the skirt 40 is, at the first side 42 thereof, fixedly and gaplessly connected to the nozzle region 32. The skirt 40 is connected to the engine apparatus 22 for accompanying the flight thereof.

Formed on the second side 44 is an exit end 46. A corresponding exit area at the exit end 46 is at least approximately parallel to an exit area at the exit end 36 of the nozzle region 32.

The skirt 40 is configured to be rotationally symmetric about the combustion chamber axis 28.

The skirt 40 has a skirt wall 48. By the skirt wall, the skirt 40 expands away from the exit end 36 of the nozzle region 32 towards the exit end 46 of the skirt 40. A diameter of the skirt 40 on the second side 44 thereof is greater than a diameter of the nozzle region 32 at the exit end 36 thereof. Therefore, a cross-sectional area of the skirt 40 at the exit end 46 thereof is greater than that of the nozzle region 32 at the exit end 36 thereof.

The skirt wall 48 is, at least at the exit end 46 thereof, at an acute angle relative to the nozzle wall 38. The acute angle is in particular in a range between 3° and 15° and is for example 5°, 7°, 10° or 15°.

An inflection exists at the transition between the nozzle region 32 and the skirt 40.

In an embodiment, the skirt wall 48 is configured, i.e. contoured, in such a manner that it lies along an isobar, i.e. a shear layer. This makes it possible to ensure that the flow separation, which has already been stabilized on the ground, jumps rapidly towards the exit end 46 of the skirt 40 as the rocket 10 ascends.

The skirt has a length $L_1$ along the combustion chamber axis 28, said length $L_1$ being smaller than a length $L_2$ of the nozzle region 32 between the throat region 30 (with the narrowest location within an interior space of the combustion chamber 24) and the exit end 36. In particular, the length $L_1$ is at most 25% of the length $L_2$.

At the narrowest location within the throat region 30, the interior space of the combustion chamber 24 has a radius R. The length $L_1$ is in a range between 0.3 R and 2.5 R and in particular a range between 0.5 R and 2 R.

The skirt 40 is associated with the engine apparatus 22. In the exemplary embodiment in accordance with FIG. 3, the skirt 40 is arranged on the engine apparatus 22 for co-flight therewith.

Figure 4:
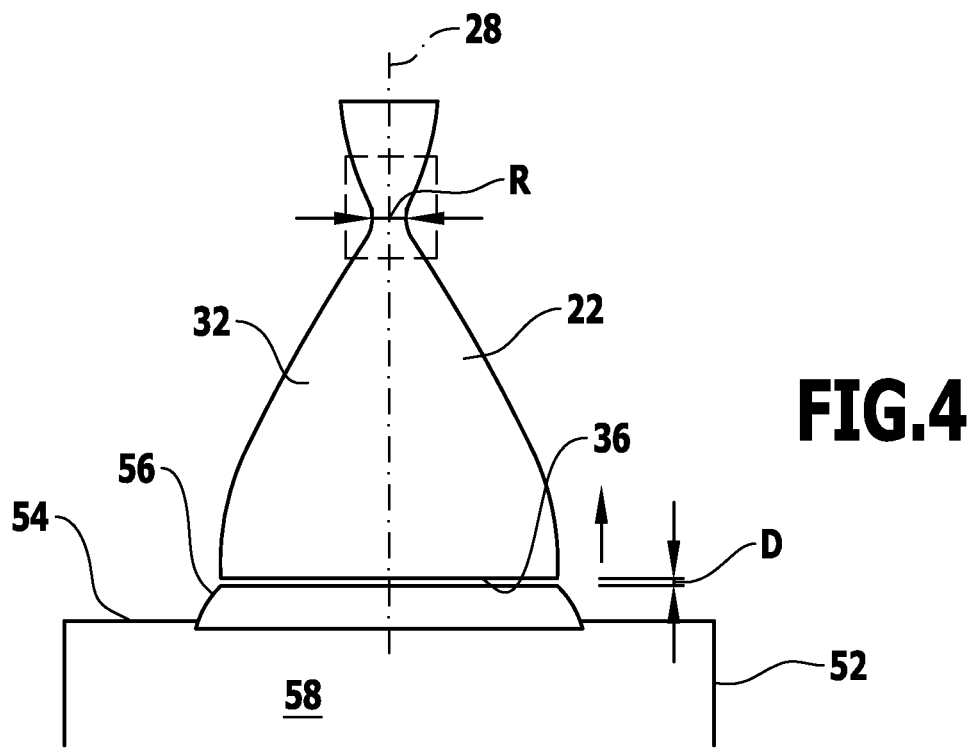
FIG. 4 is a schematic representation of a second exemplary embodiment of an engine apparatus constructed in accordance with the invention in association with a launching ramp.

In an exemplary embodiment which is shown schematically in FIG. 4, a test stand or launching ramp 52 is provided for the flying object 10. Said test stand or launching ramp 52 comprises a holding area 54. A skirt 56 is arranged on the holding area 54 in a fixed (non-co-flying) manner. The skirt 56 has for example a conical shape (with a cone axis that is coaxial with the combustion chamber axis 28). Prior to start, the engine apparatus 22 is placed in such a manner that the exit end 36 of the nozzle region 32 of the engine apparatus 22 lies as close to the skirt 56 as possible (with as small a gap as possible between them).

In an exemplary embodiment, a distance D between the exit end 36 of the nozzle region 32 and the skirt 56 amounts to about 0.4 of the radius R in the throat region 30. By way of example, said distance D (gap size) amounts to 5 cm.

The skirt 40 is positioned in such a manner that a space region 58 exists beneath it which permits the inflow of air.

The skirt 40 works as follows.

In principle, flow separation occurs in the supersonic part of the engine apparatus 22 in a startup sequence and shutdown sequence of the engine apparatus 22. Said flow separation is asymmetrically distributed about an (inner) circumference of the nozzle region 32. As the combustion chamber pressure increases, the region of the flow separation moves in a direction towards the exit end 36. The asymmetric distribution leads to high side loads imposing loads on the structure and in particular the nozzle wall 38 and the engine apparatus 22 as a whole.

The side loads occurring during the startup phase and the shutdown phase usually reach magnitudes that are far beyond the side loads of an engine apparatus operating at nominal combustion chamber pressure.

If the side loads occurring in the startup sequence and shutdown sequence can be reduced, then the engine apparatus 22 can be built lighter in the nozzle region 32. Furthermore, hydraulic control units for example, which are required for compensating side loads and tilting the engine apparatus 22, can be implemented using simpler design.

Through the use of the skirt 40 or 56, side loads occurring in the startup sequence and shutdown sequence can be damped or reduced. This in turn enables a "lightweight construction". Furthermore, control or adjustment elements can be implemented using simple design. It also allows the use of payloads that are sensitive to transverse forces.

On the whole, the costs of the engine apparatus 22 and of the flying body's structure are reduced, the payload capacity is increased and the range of application in terms of payload qualification is widened.

Figure 5:
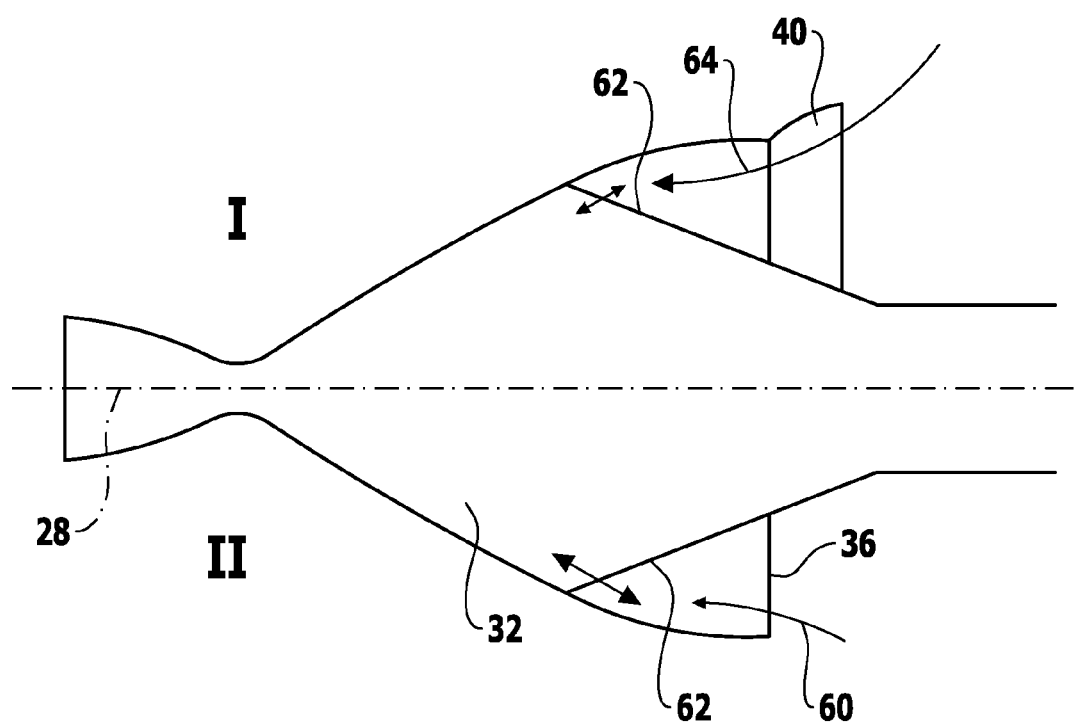
FIG. 5 is a schematic representation of the function of a skirt (region I), as compared to a case with no skirt (region II)

As shown schematically in lower region II of FIG. 5 for the case where there is no skirt 40 or 56, an inflow of air (as indicated by the reference numeral 60) into the nozzle region 32 occurs in the startup phase or switch-on phase. The air flows into a separation region 62 of the nozzle region 32 in which separation of flow occurs.

In the solution in accordance with the invention, the skirt 40 or 56 exists. By the expansion of the area at the exit end 46 of the skirt 40 or 56, as compared to the exit end 36, the volume of air (indicated by the arrow by the reference numeral 64) flowing into the separation region 62 can be increased, i.e. a larger volume of air is drawn into the separation region of the supersonic nozzle. The increased mass flow, as compared to the case with no skirt 40 or 56, results in increased damping of fluctuations of the flow separation and of the flow in the separated region and thus in a reduction of side forces.

Figure 6:
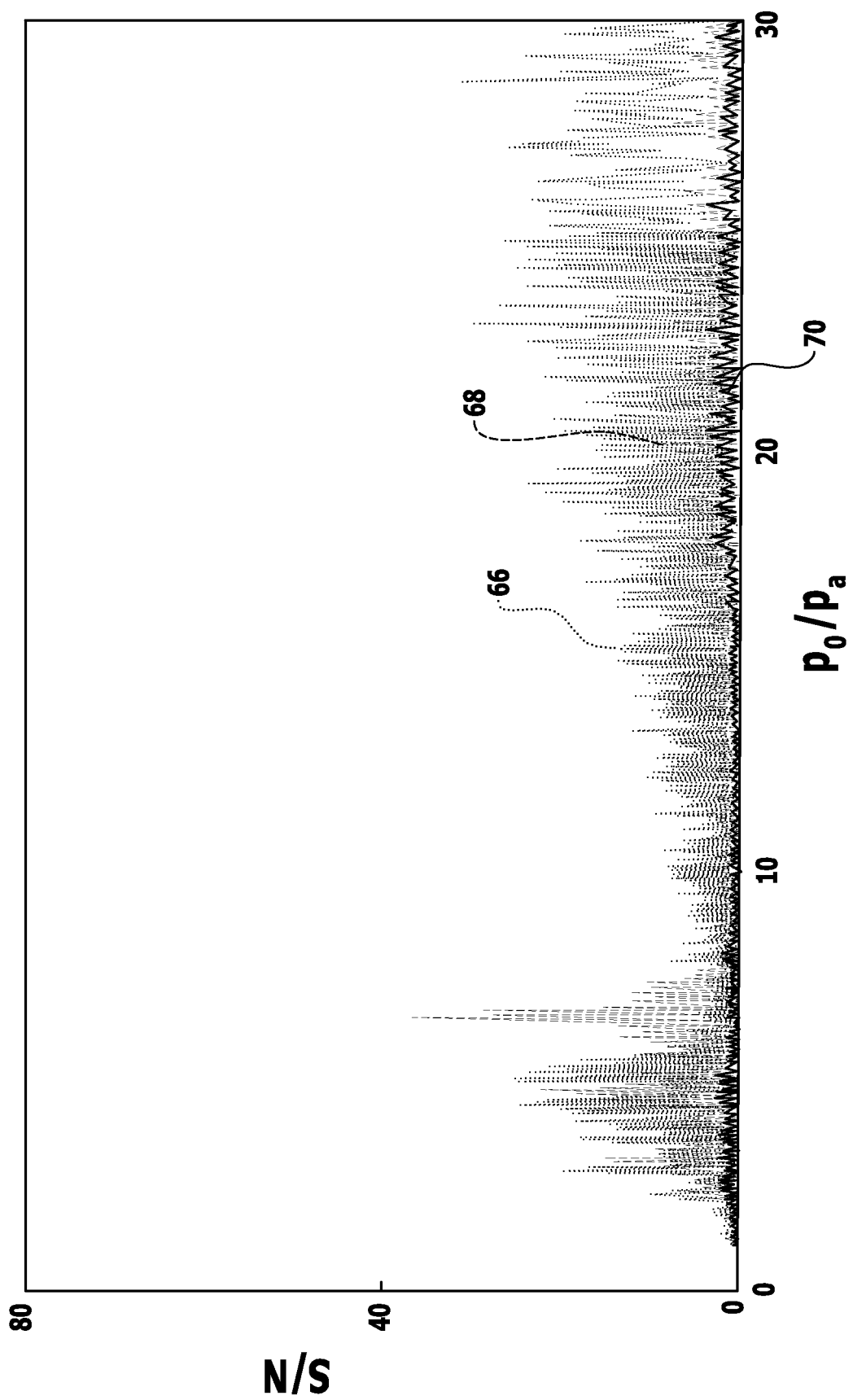
FIG. 6 is a diagram showing side loads as a function of the pressure ratio $p_o/p_a$ (combustion chamber pressure to ambient pressure in a cold gas model) in the cases of no skirt present, a skirt present at an acute angle of 5° and a skirt present at an acute angle of 7°.

FIG. 6 shows the course of side forces (in Newton) as a function of the pressure ratio $p_o/p_a$ for three different cases. Here, $p_o$ is the total pressure or combustion chamber pressure of the engine apparatus 22; $p_a$ is the ambient pressure of the engine apparatus 22. The ambient pressure $p_a$ is constant at ignition and in the startup phase of the engine apparatus 22. For example, the combustion chamber pressure increases from 1 bar (no combustion, empty combustion chamber 24) prior to ignition to the stable nominal value of the engine apparatus 22 (full load). In an exemplary embodiment, said nominal value is 115 bar.

FIG. 6 shows the side loads of the starting engine apparatus 22 at any given time. The corresponding data were determined starting from a cold gas model in which nitrogen is expanded under high pressure. No hot combustion gases are produced in the cold gas model.

The black curves 66 show the side load for the conventional case without skirt 40 or 56. The grey curves 68 show the case of a skirt 40 at an acute angle 50 of 5°. The light grey curves 70 show the same case but using an acute angle of 7°. Clearly, providing the skirt 40 reduces the side load over a wide range of the pressure ratio, this being accompanied by the advantages described above.

As mentioned above, provision may be made for the skirt 40 to be connected with the engine apparatus 22 directly, or for the skirt 56, which is then in particular reusable, to act on the supersonic region of the nozzle region 32 only in the startup phase.

By use of the skirts 40, 56, an intake cross-section of the nozzle region 32 is increased. This increases the mass flow of intake ambient air as well as the velocity thereof. The inflection at the transition between the nozzle wall 38 and the skirt wall 48 stabilizes the flow during nominal operation of the engine apparatus 22.

In principle, a skirt 40 has no effect on full load operation of the engine apparatus 22.

If the skirt 40 is designed along an isobar (shear layer), it is possible to ensure that the flow separation, which has already been stabilized on the ground, jumps rapidly towards the exit end 46 of the skirt 40 as the flying object 10 ascends.

The skirt 40 or 56 is particularly advantageous if the engine apparatus 22 is ignited on the ground.

An engine apparatus 22 in accordance with the invention is arranged on a lower stage or a main stage of a flying object 10 and in particular on a carrier rocket.

LIST OF REFERENCE NUMBERS

10 flying object
12 main body
14 payload unit
16 solid booster
18 first tank
20 second tank
22 engine apparatus
24 combustion chamber
26 combustion chamber wall
28 combustion chamber axis
30 throat region
32 nozzle region
34 combustion space region
36 exit end
38 nozzle wall
40 skirt
42 first side
44 second side
46 exit end
48 skirt wall
50 acute angle
52 test stand, starting ramp
54 holding area
56 skirt
58 space region
60 flow
62 separation region
64 volume of air
66 curve
68 curve
70 curve
$L_1$ length of skirt 40, 56
$L_2$ length of nozzle region 32
R radius of throat region 30
D distance between exit end 36 and skirt 56

That which is claimed:

1. An engine apparatus for a flying object, comprising:
   a combustion chamber having a throat region and a nozzle region, said nozzle region having a nozzle wall;
   wherein the nozzle region expands from the throat region towards an exit end relative to a combustion chamber axis;
   wherein the nozzle region has associated therewith a skirt and a gap between the exit end and the skirt for admitting ambient air;
   said skirt having a skirt wall, said skirt being positioned downstream relative to the exit end of the nozzle region and surrounding the exit end of the nozzle region;
   said skirt having a skirt exit end and a cross-sectional area of the skirt exit end being greater than a cross-sectional area of the nozzle at the exit end of the nozzle;
   wherein the skirt wall is at an acute angle away from the combustion chamber axis with respect to the nozzle wall, at least at the exit end of the nozzle region; and
   wherein the skirt is fixed to a holding area from where the flying object which is provided with the engine apparatus is launched.

2. The engine apparatus in accordance with claim 1, wherein the skirt expands outward relative to the combustion chamber axis.

3. The engine apparatus in accordance with claim 1, wherein the skirt is configured to be rotationally symmetric about the combustion chamber axis.

4. The engine apparatus in accordance with claim 1, wherein the nozzle region is the nozzle region of a supersonic nozzle.

5. The engine apparatus in accordance with claim 1, wherein an inflection exists between the nozzle wall and the skirt wall at the transition from the exit end of the nozzle region to the skirt.

6. The engine apparatus in accordance with claim 1, wherein the acute angle is in a range between 3° and 15°.

7. The engine apparatus in accordance with claim 1, wherein a length of the skirt along the combustion chamber axis is at most 25% of the length of the nozzle region along the combustion chamber axis.

8. The engine apparatus in accordance with claim 1, wherein a length of the skirt along the combustion chamber axis is in a range between 0.3 and 2.5, and in particular a range between 0.5 and 2, of a radius in the throat region.

9. The engine apparatus in accordance with claim 1, wherein said gap is up to 0.6 of a radius in the throat region, and in particular up to 0.5 of the radius, and in particular 0.4 of the radius.

10. The engine apparatus in accordance with claim 1, wherein the skirt wall has a contour which lies along an isobar.

11. The engine apparatus in accordance with claim 1, wherein the acute angle is in a range between 3° and 15°, wherein a length of the skirt along the combustion chamber axis is at most 25% of the length of the nozzle region along the combustion chamber axis, and wherein the length of the skirt along the combustion chamber axis is in a range between 0.3 and 2.5, the skirt increasing the mass flow and the velocity of intake ambient air.

12. The engine apparatus in accordance with claim 1, wherein the skirt increases the mass flow and the velocity of intake ambient air.

13. A flying object, in particular a rocket, which is provided with an engine apparatus comprising:
   a combustion chamber having a throat region and a nozzle region, said nozzle region having a nozzle wall;
   wherein the nozzle region expands from the throat region towards an exit end relative to a combustion chamber axis;
   wherein the nozzle region has associated therewith a skirt and a gap between the exit end and the skirt for admitting ambient air;

said skirt having a skirt wall, said skirt being positioned downstream relative to the exit end of the nozzle region and surrounding the exit end of the nozzle region;

said skirt having a skirt exit end and a cross-sectional area of the skirt exit end being greater than a cross-sectional area of the nozzle at the exit end of the nozzle;

wherein the skirt wall is at an acute angle away from the combustion chamber axis with respect to the nozzle wall, at least at the exit end of the nozzle region; and wherein the skirt is fixed to a holding area from where the flying object which is provided with the engine apparatus is launched.

14. The flying object in accordance with claim 13, wherein provision is made for the engine apparatus to be ignited on the ground.

15. The flying object in accordance with claim 13, wherein the engine apparatus is arranged on a lower stage or a main stage of the flying object.

16. A test stand or launching ramp for a flying object which is provided with an engine apparatus, said engine apparatus comprising:

a combustion chamber having a throat region and a nozzle region, said nozzle region having a nozzle wall;

wherein the nozzle region expands from the throat region towards an exit end relative to a combustion chamber axis;

wherein the nozzle region has associated therewith a skirt and a gap between the exit end and the skirt for admitting ambient air;

said skirt having a skirt wall, said skirt being positioned downstream relative to the exit end of the nozzle region and surrounding the exit end of the nozzle region;

and wherein the skirt wall is at an acute angle away from the combustion chamber axis with respect to the nozzle wall, at least at the exit end of the nozzle region;

said skirt having a skirt exit end and a cross-sectional area of the skirt exit end being greater than a cross-sectional area of the nozzle at the exit end of the nozzle;

said stand or ramp comprising a non-co-flying holding area at which the skirt is arranged; and wherein a space region is arranged beneath the skirt which permits the inflow of air into the skirt.

17. The test stand or launching ramp for a flying object in accordance with claim 16, wherein said gap is up to 0.6 of a radius in the throat region, and in particular up to 0.5 of the radius, and in particular 0.4 of the radius.

18. A Method for reducing a side load in an engine apparatus, particularly in at least one of a startup phase and a shutdown phase, in which method the engine apparatus comprises a combustion chamber having a throat region and a nozzle region, said nozzle region having a nozzle wall;

wherein the nozzle region expands from the throat region towards an exit end relative to a combustion chamber axis;

wherein the nozzle region has associated therewith a skirt and a gap between the exit end and the skirt for admitting ambient air; said skirt having a skirt wall, said skirt being arranged downstream relative to the exit end of the nozzle region and surrounding the exit end of the nozzle region;

said skirt having an exit cross-sectional area greater than a cross-sectional area of the nozzle at the exit end of the nozzle;

wherein the skirt wall is an at acute angle away from the combustion chamber axis with respect to the nozzle wall, at least at an exit end of the nozzle region;

wherein the skirt is fixed to a holding area from where a flying object is provided with the engine apparatus is launched; and wherein by use of the skirt a larger volume of air is drawn into a separation region of the nozzle region as compared to the case without a skirt.

\* \* \* \* \*